United States Patent [19]
McHugh et al.

[11] Patent Number: 5,872,162
[45] Date of Patent: Feb. 16, 1999

[54] CORRECTION FLUID FOR WATER-FAST INKS

[75] Inventors: Brian K. McHugh, Harvard; Norman G. Sanborn, South Weymouth, both of Mass.

[73] Assignee: The Gillette Company, Boston, Mass.

[21] Appl. No.: 240,159

[22] Filed: May 10, 1994

Related U.S. Application Data

[63] Continuation-in-part of Ser. No. 233,516, Apr. 26, 1994, abandoned, which is a continuation of Ser. No. 072,168, Jun. 4, 1993, abandoned.

[51] Int. Cl.⁶ .................................................. C09D 10/00
[52] U.S. Cl. ..................... 523/161; 523/210; 524/430; 524/451; 524/556
[58] Field of Search .................................. 523/161, 210; 524/556, 451, 430

[56] References Cited

U.S. PATENT DOCUMENTS

| | | | |
|---|---|---|---|
| 3,674,729 | 7/1972 | Mirick | 524/556 |
| 3,769,255 | 10/1973 | Sheehan et al. | 523/216 |
| 3,997,498 | 12/1976 | Reese et al. | 523/161 |
| 4,530,954 | 7/1985 | Arpin | 524/387 |
| 4,654,081 | 3/1987 | Dalzell | 524/145 |
| 4,687,789 | 8/1987 | Gonnet et al. | 523/122 |
| 5,026,755 | 6/1991 | Kveglis et al. | 524/389 |
| 5,164,433 | 11/1992 | Ricci et al. | 524/47 |
| 5,199,976 | 4/1993 | Yau et al. | 106/19 A |
| 5,332,599 | 7/1994 | Sanborn | 427/259 |
| 5,338,775 | 8/1994 | Matz et al. | 523/161 |
| 5,370,922 | 12/1994 | Sanborn et al. | 428/201 |
| 5,514,450 | 5/1996 | Sanborn et al. | 428/204 |

FOREIGN PATENT DOCUMENTS

| | | |
|---|---|---|
| 3919-588 A | 12/1989 | Germany . |
| 4036625 A | 4/1992 | Germany . |
| 59-024764 | 2/1984 | Japan . |
| 59-193973 | 11/1984 | Japan . |
| 62-183845 | 8/1987 | Japan . |
| 62-267372 | 11/1987 | Japan . |
| 63-99273 | 4/1988 | Japan . |
| 1261-473 | 10/1989 | Japan . |
| 2173-167 | 7/1990 | Japan . |
| 2-199180 | 8/1990 | Japan . |
| 2-202561 | 8/1990 | Japan . |
| 2-209973 | 8/1990 | Japan . |
| 5-5071 | 1/1993 | Japan . |
| 0891730 | 12/1981 | U.S.S.R. . |
| 2 058 110 | 8/1981 | United Kingdom . |
| WO9207039 | 4/1992 | WIPO . |

OTHER PUBLICATIONS

Henkel Corp., Nopcosperse 44, Material Safety Data Sheet (Mar. 10, 1993).
Henkel Corp., Nopcosperse 44, Coatings & Inks Data Sheet ARC–102 date!.
DuPont Chemicals, TI–Pure, Material Safety Data Sheet (Sep. 6, 1992).
DuPont Chemicals, TI–Pure R–900, brochure date.
Dry Branch Kaolin Company, Kaopaque 1–S, Material Safety Data Sheet (Jul. 27, 1982).
Dry Branch Kaolin Company, Delaminated Kaolins, brochure date.
Union Carbide, UCAR Emulsion Systems, UCAR Latex 446, Ingredient Identification Sheet (Aug. 3, 1989).
Union Carbide, UCAR Emulsion Systems, UCAR Latex 446, Material Safety Data Sheet (Aug. 10, 1992).
Union Carbide, UCAR Emulsion Systems, UCAR Latex 100, UCAR Polymers, brochure (1987).
Air Products and Chemicals, Inc., Surfynol 104PA Surfactant, Material Safety Data Sheet (Nov. 1991).
Air Products and Chemicals, Inc., Surfynol 104 Surfactant, brochure (1990).
Rohm and Haas Company, Rhoplex–R PR–26 Emulsion, Material Safety Data Sheet (Oct. 2, 1991).
Rohm and Haas Company, Kathon(R) CG/ICP Preservative, Material Safety Data Sheet (Feb. 24, 1993).
Henkel Corporation, Nopco 8034, Data Sheet ARC–143 (1992).
"Correction fluid for dye–based ink print," Abstract, 18182, *Research Disclosure* (May 1979).
Chemical Composition of Kathon CG/ICP and Kathon CG/ICP II Biocides, Chemical Identification, brochure.

*Primary Examiner*—Marion E. McCamish
*Assistant Examiner*—John J. Guarriello
*Attorney, Agent, or Firm*—Fish & Richardson P.C.

[57] ABSTRACT

Correction fluids are provided which include an opacifying pigment, a water-fast ink fixing agent including a cationic non-film-forming polymer, a binder including a film-forming polymer compatible with the ink fixing agent, and water. The new correction fluids have improved "bleed" resistance when used to correct water-fast inks, such as ball-point pen inks.

25 Claims, No Drawings

CORRECTION FLUID FOR WATER-FAST INKS

RELATED APPLICATION

This application is a continuation-in-part of U.S. Ser. No. 08/233,516, filed Apr. 26, 1994, abandoned, which was a continuation of U.S. Ser. No. 08/072,168, filed Jun. 4, 1993 and now abandoned.

FIELD OF THE INVENTION

The invention relates to correction fluids for water-fast inks, such as ball-point pen inks.

BACKGROUND OF THE INVENTION

Correction fluids are used for correcting handwritten, typewritten, photocopied, or laser printed markings on paper. Generally, correction fluids are applied to a paper surface in liquid form, and then allowed to dry to form a film which effectively covers erroneous markings on the surface and can receive a correct marking.

Water-based correction fluids, which are better for the environment than solvent based systems, typically include a pigment, e.g., titanium dioxide, and a latex binder, which is usually an aqueous polymer emulsion. Typical latex binder polymer emulsions are acrylic copolymers and ethylene vinyl acetate (EVA), which minimize the dissolution of underlying markings to which the fluid is applied, and imparts other advantageous properties to the fluid. Such dissolution of the markings causes so-called "bleeding" or "smudging" of the markings into the correction fluid, which causes a discoloration of the fluid film and corrected spot.

Although such water-based correction fluids based on emulsion polymer binders are effective on handwritten, typewritten, or photocopied markings, they do not prevent the problem of bleeding or smudging on all types of markings. For example, one type of marking that is difficult to cover with correction fluids without bleeding of the marking into the correction fluid is so-called "water-fast" ink, e.g., ball-point pen ink. Although these inks are referred to as water-fast, they contain a certain percentage of components, including dyes, that are water soluble. It is this water-soluble portion, i.e., about 5 to 15% of the water-fast inks, that causes the bleeding problem.

Although this type of ink has been widely used for many years, e.g., in so-called "stick" pens, of which over 3 billion are sold annually, the problem of bleeding or smudging of correction fluid when used to correct such markings persists.

SUMMARY OF THE INVENTION

The invention features aqueous correction fluids that have good bleed resistance when used to cover marks made with water-fast inks. As used herein, the term "water-fast ink" means an ink that is mostly impervious to water, but which includes less than about 15% water soluble ingredients, including dyes. Ball-point pen ink, as used herein, is a water-fast ink.

One featured correction fluid includes water, an opacifying pigment dispersed in the water, a cationic polymer that inhibits bleeding, and a water insoluble film-forming polymer. The quantity of water, opacifying agent, cationic polymer, and film-forming polymer used in the correction fluid are selected so that the correction fluid has a solids content of at least 60% (preferably at least 65%, and more preferably at least 68%) and a viscosity of less than 1500 cps (preferably between 100 cps and 1,000 cps). The high solids content (and thus low water content) and the relatively low viscosity provides a correction fluid having a drying time of less than 90 seconds, preferably less than 60 seconds. Because of the relatively low viscosity, the featured correction fluid can be applied with a brush.

As used herein, a "water insoluble" film-forming polymer is a film-forming polymer that when used in the correction fluid does not dissolve in the correction fluid, but rather is in the form of an emulsion or dispersion. A "film-forming" polymer, as used herein, is a polymer component of the correction fluid that forms a film when the fluid is applied over a mark on a paper substrate and the water is absorbed by the substrate and/or evaporates to form a continuous film. Film-forming polymeric chains are sufficiently deformable so that coalescence occurs upon absorbtion and/or evaporation of the water, which causes random packing and entanglement of the polymer molecular chains.

The featured correction fluid is particularly suitable for application to marks made with water-fast inks, such as typical ball-pen inks, because the correction fluid contains the cationic polymer. The cationic polymer inhibits bleeding of the ink through the corrective coating by hindering the movement of anionic dyes from the ink mark through the corrective coating. Of course, the featured fluids also can be used to correct other types of marking such as typewritten, photocopied, or laser printed markings. The high solids content of the correction fluid, and in particular the high quantity of opacifying pigment and, if present auxiliary pigments, also makes the corrective covering less susceptible to bleed.

The cationic, bleed-inhibiting polymer and the water insoluble film-forming polymer can be separate and distinct polymers or can be one polymer that performs both bleed-inhibiting and film-forming functions.

A second featured correction fluid includes an opacifying pigment, a water-fast ink fixing agent including a cationic non-film-forming polymer, a binder including a film-forming polymer compatible with the ink fixing agent, and water.

As used herein, a "water-fast ink fixing agent" is any cationic non-film-forming polymer that has the ability to "fix" or bind anionic dye in water-fast inks, and prevent and/or retard the dye from moving through the correction fluid away from the surface of the paper. This prevents the dye from noticeably discoloring the correction fluid.

A film-forming polymer that is "compatible" with the ink fixing agent is any emulsion polymer or polymer dispersion that will not cause destabilization of the correction fluid in the presence of the cationic ink fixing agent.

A "non-film-forming" polymer is any polymer that can not form a continuous dry film because the resistance of deformation of the polymeric molecular chains is greater than the capillary forces between those polymeric chains. Coalescence therefore does not occur, and no continuous film forms.

In preferred embodiments of the featured correction fluids, the opacifying pigment is a rutile titanium dioxide composition including titanium dioxide particles having an average diameter of less than 0.8 micrometer and having a hydrophilic surface. For example, the titanium dioxide particles can comprise at least 94% by weight of the titanium dioxide composition, and their hydrophilic surface can result from treatment of the particles with alumina or a combination of alumina and silica.

The featured correction fluids preferably includes an anionic dispersant, e.g., a sodium salt of a carboxylate polyelectrolyte, e.g., a maleic anhydride copolymer or polymethyl-methacrylic acid, and a nonionic wetting agent, e.g., a nonionic surfactant including an acetylenic diol and alcohol. As used herein, a "polyelectrolyte" is a high polymer substance, either natural, e.g., protein or gum arabic, or synthetic, e.g., polyethyleneimine or polyacrylic acid salts. The polyelectrolyte dissolves in the aqueous phase and becomes ionized. The positively and negatively charged ions preferentially adsorb onto the pigment particle surface to produce an outer coating of diffuse charge. Coulombic repulsion of like charges keeps the ion "coated" particles separated and prevents flocculation.

Other preferred embodiments of the featured correction fluids include between 45 and 60%, and preferably between 47 and 53%, of the opacifying pigment by weight, between 0.5 and 5.0%, and preferably between 0.8 and 1.2%, of a cationic polymer by weight, between 10 and 30%, and preferably between 18 and 25%, of a film-forming polymer by weight, and between 15 and 30%, and preferably between 18 and 22%, water by weight, of the correction fluid. The featured correction fluids also preferably includes between 0.5 and 1.5% by weight of an anionic dispersant, and/or between 0.5 and 2.0% by weight of a nonionic wetting agent. Preferably, the featured correction fluids contain substantially no (less than about 1%) organic solvents.

Significantly, the featured correction fluids typically are washable. By "washable", it is meant that the correction fluid prior to drying can be substantially totally washed, for example, off clothing or carpets with water and, even after drying, can be significantly washed off clothing or carpets with soap and water.

The invention also features a method of covering a water-fast ink marking on paper by applying (preferably by brushing) one of the featured correction fluids over a marking made by a water-fast ink.

In another aspect, the invention features a water-based correction fluid that includes greater than 45 percent by weight of an opacifying pigment, an anionic dispersant, and water. The dispersant is preferably a sodium salt of a carboxylate polyelectrolyte.

In another aspect, the invention features a method of making a stable water-based correction fluid by mixing water with an opacifying pigment and a pigment dispersing agent to form a dispersion, adding a film-forming polymeric binder to the dispersion and mixing to distribute the binder in the pigment dispersion, and then adding a water-fast ink fixing agent including a cationic non-film-forming polymer to the dispersion at a rate that prevents destabilization, wherein the binder is compatible with the ink fixing agent.

Other features and advantages of the invention will be apparent from the Description of the Preferred Embodiments thereof, and from the claims.

DESCRIPTION OF THE PREFERRED EMBODIMENTS

The preferred correction fluids include water as the aqueous diluent; a rutile titanium dioxide composition, which includes at least 94% $TiO_2$ that is surface treated with alumina or a combination of alumina and silica, as the primary pigment; a cationic non-film-forming acrylic polymer as the ink fixing agent; an acrylic film-forming polymer emulsion that is compatible with the cationic ink fixing agent as the binder; hydrous aluminum silicate (kaolin clay) as the extender pigment; black and burnt umber pigments as the colorants to color match recycled white paper; a nonionic surfactant including acetylenic diol and alcohol as the nonionic wetting agent; an anionic sodium salt of a carboxylate polyelectrolyte as the pigment dispersant; a biocide as the preservative; and a defoaming agent. These correction fluids have a pH of between 4 and 11, and preferably between 7.5 and 10.

A sufficient amount of the water should be used to make the fluid thin enough to be easily applied to paper, e.g., by a brush. The total amount of water present in the finished fluid is dependent on viscosity. Adjustments are made by first measuring the viscosity of the composition, and then adding incremental amounts of water until the desired viscosity is obtained. It is preferred that sufficient water be added to provide a viscosity from about 100 to 1000 cps, and preferably from about 300 cps to 600 cps as measured on a Brookfield Viscometer. In addition, too much water would undesirably increase the drying time of the fluid. Preferably, the correction fluid should include 15 to 30%, and more preferably 18 to 22%, water by weight of the total composition.

Any suitable opacifying pigment having adequate hiding power to cover ball-point pen ink may be utilized as the primary pigment in the correction fluids of the invention. However, the pigment must have a certain average particle size, e.g., less than 0.8 micrometer, to increase dispersibility, and be treated with alumina or a combination of alumina and silica to have a hydrophilic surface. Titanium dioxide is most preferred, as it provides for maximum hiding and is a white pigment which can be toned to match a variety of bright paper stock colors. Suitable titanium dioxide pigments include commercially available rutile titanium dioxides and anatase titanium dioxides, or blends or mixtures of these which preferably have an average particle size between approximately 0.2 to 0.4 microns and an average oil absorption of about 16 g/100 g pigment.

The preferred titanium dioxide for the primary pigment is Ti-Pure® R-900 (DuPont, Wilmington, Del.), which is a rutile titanium dioxide composition manufactured by the chloride process. This composition includes about 94% $TiO_2$, and 4.5% alumina. The particle size varies, but 80% of the particles are 0.4 microns or smaller, and 90% of the particles are under 0.6 microns. The pH of Ti-Pure® R-900 in an aqueous suspension is approximately 8.2.

Other suitable titanium dioxide compositions include Ti-Pure® R-901, Tioxide R-XL (Tioxide America, Inc., Columbia, Md.) and Kronos 2131 (Kronos, Inc., Houston, Tex.). Other opacifying pigments may be used, either alone, but preferably in combination with the titanium dioxide. Such pigments include zinc sulfide and zinc oxide.

Sufficient titanium dioxide should be included so that a mark on paper is not visible after curing, but not so much that it interferes with the formation of a solid film. Preferably, the correction fluid should include 45 to 60%, and more preferably 47 to 53%, of the pigment by weight of the total composition.

The preferred ink fixing agent is an aqueous dispersion of a cationic non-film-forming acrylic copolymer emulsion such as Rhoplex® PR-26 (Rohm & Haas, Philadelphia, Pa.). This particular ink fixing agent contains about 27 to 29% acrylic copolymer, and about 2 to 4% alkylaryl polyether alcohol in 69 to 70% water. The pH of an aqueous suspension of Rhoplex® PR-26 should be above about 7.0 to maintain the stability of this polymer.

Enough of this agent must be used to achieve the desired non-bleed properties of the correction fluid. In effect, this cationic polymer absorbs the anions from the ball-point pen ink that cause the bleeding before they have a chance to bleed through the corrective coating. Preferably, the correction fluid should include about 0.5 to 5.0%, and more preferably 0.8 to 1.2%, of this ink fixing agent by weight of the total composition.

The preferred binder is an acrylic film-forming polymer, which is compatible with the cationic ink fixing agent, such as UCAR® Latex 446 (Union Carbide, Cary, N.C.). UCAR Latex 446 is a latex emulsion including synthetic acrylate/styrene polymers that is nonionically stabilized and is compatible with the cationic ink fixing polymer. UCAR® Latex includes about 38% water and 62% copolymer of methyl methacrylate, butyl acrylate, styrene, methacrylic acid, and 2-hydroxyethyl acrylate. This particular binder also includes about 0.03% formaldehyde and 0.02% ammonia. Other binders include Elvace 40705 (Reichold Chemicals, Inc., Research Triangle Park, North Carolina), which is a nonionic ethylene vinyl acetate copolymer; Rhoplex® AC-707 (Rohm & Haas); Rhoplex® TP-257 (Rohm & Hass); and Rhoplex® AC-264 (Rohm & Haas).

A sufficient amount of the binder should be used to effectively bind the pigments to paper and form a continuous dry film at or below room temperature which is substantially water resistant. The film should also be receptive to correct marks without cracking and flaking off the paper. Preferably, the correction fluid should include 10 to 25%, and more preferably 15 to 22%, of the film-forming binder by weight of the total composition.

The preferred extender pigment can be any kaolin ("China") clay, such as Kaopaque® 10-S (Dry Branch Kaolin Co, Dry Branch, Ga.), which includes greater than 97% kaolin clay ($Al_2O_3.2SiO_2.2H_2O$), less than 3% water, and 0.35% of a sodium polyacrylate/soda ash dispersant. Other suitable kaolin clays are McNamee Clay (R. T. Vanderbilt, Inc., Norwalk, Conn.) and Huber 40C (J. M. Huber Corp., Macon, Ga.). The extender pigment is added in an amount that enhances the ability to write with ball-point pen ink over the corrected spot. Preferably, the correction fluid should include 5 to 15%, and more preferably 5 to 10%, of the extender pigment by weight of the total composition.

To color match, e.g., a white recycled paper, the titanium dioxide primary pigment must be tinted with other colorants, such as black and burnt umber, using standard color matching techniques. The preferred black pigment is a black iron oxide pigment such as Mars Black (Binney & Smith, Winfield, Kans.). The preferred burnt umber pigment is an aqueous dispersion of pigment brown 7, pigment red 101, and pigment yellow 42, such as Aurasperse® Burnt Umber W-3247X (Engelhard, Solon, Ohio). These colorants are used in amounts to color match the shade of white of the paper on which the correction fluid is to be used. Of course, colored correction fluid for colored paper can also be made. Preferably, the correction fluid should include less than 2.0% colorants by weight of the total composition.

The preferred wetting agent is a nonionic surfactant including acetylenic diol and alcohol such as Surfynol® 104 Pa. (Air Products and Chemicals, Inc., Allentown, Pa.) which is a mixture of 2,4,7,9-tetramethyl-5-decyne-4,7-diol and isopropyl alcohol. This surfactant is used to reduce the surface tension of the correction fluid to ensure good wetting properties. Preferably, the correction fluid should include about 0.3 to 2.0%, and more preferably 0.45 to 1.5%, of this wetting agent by weight of the total composition.

The preferred anionic pigment dispersants are sodium salts of carboxylate polyelectrolytes such as Nopcosperse® 44 (Henkel Corp., Ambler, Pa.), or preferably sodium salts of maleic anhydride copolymers, e.g., TAMOL® 731 SD (Rohm & Haas, Philadelphia, Pa.), or sodium salts of polymethylmethacrylic acid. Such a dispersant should be added in a sufficient amount to ensure complete dispersion of the high quantity of pigment in the correction fluid at low viscosity and with little or no foam generation. Other suitable polyelectrolytic acrylate dispersants include TAMOL® 850, or 960. Preferably, the correction fluid should include 0.5 to 1.5%, and more preferably 0.8 to 1.1%, of the dispersant by weight of the total composition.

A preferred preservative is a biocide such as Kathon® (Rohm & Haas, Philadelphia, Pa.), which is a mixture of two isothiazolinones, 5-chloro-2-methyl-4-isothiazolin-3-one and 2-methyl-4-isothiazolin-3-one. Other suitable or preferred preservatives or biocides include Glycacil-L, Glycacil-S, Proxel GXL (Rohm & Haas). The preservative or biocide is used to prevent bacteria from contaminating the correction fluid. Bacteria attack acrylic polymers, and are often found dormant in some of the ingredients, e.g., pigments, used to manufacture correction fluids. A sufficient amount to prevent bacterial growth should be used. The correction fluid should include about 0.05 to 1.0%, and preferably 0.03 to 0.1% Kathon®, or 0.1 to 0.65% Germaben II, by weight of the total composition.

The preferred defoaming agent is Nopco® 8034 (Henkel Corp., Ambler, Pa.), although any defoaming agent typically used in correction fluids can be used. Such defoaming agents are usually mineral oil derivatives mixed with amorphous silica, and should be added in an amount sufficient to ensure that the correction fluid is deaerated and does not foam when shaken. Preferably, the correction fluid should include 0.05 to 1.0%, and more preferably 0.21 to 0.4% defoaming agent by weight of the total composition.

The preferred correction fluids should have a drying time of less than about 90 seconds. More preferred correction fluids have a drying time of less than about 60 seconds. Correction fluids are tested for drying time, as that term is used herein, by applying the fluid to a marking on paper (e.g., notepad paper available from Tops Business Forms of St. Charles, Ill. and marketed as "The LEGAL PAD") and at 5 second intervals determining the time when you can write over or type over the fluid without disturbing the surface of the corrected mark. The correction fluid does not have to completely dry before a written or typed marking can be applied.

Drying time is dependent in significant part on the quantity of water in the correction fluid and the viscosity of the correction fluid. As mentioned previously, the larger the quantity of water in the correction fluid, the longer the drying time. Of course, the larger the quantity of solids in the correction fluid the less water in the fluid and the faster the drying time. It is preferred that the correction fluid contain at least 65% by weight solids; more preferably the correction fluid contains at least 68% by weight solids. Solids as used herein are the components of the film once the water evaporates and predominantly include the pigments and the film-forming polymer.

The following examples illustrates the invention.

| Ingredients | Example 1 Weight percent | Example 2 Weight percent |
| --- | --- | --- |
| WATER | 18.86 | 20.08 |
| NOPCOSPERSE ® 44 | 1.02 | 1.07 |
| TI-PURE ® R-900 | 52.63 | 50.30 |
| KAOPAQUE ® 10-S | 5.85 | 5.59 |

-continued

| Ingredients | Example 1 Weight percent | Example 2 Weight percent |
| --- | --- | --- |
| MARS BLACK | 0.49 | 0.25 |
| BURNT UMBER | 0.24 | 0.12 |
| UCAR ® LATEX 446 | 19.26 | 20.30 |
| SURFYNOL ® 104 PA | 0.47 | 0.78 |
| RHOPLEX ® PR-26 | 0.89 | 0.86 |
| KATHON ® | 0.06 | 0.13 |
| NOPCO ® 8034 | 0.23 | 0.20 |
| GLYCACIL-L | — | 0.30 |
|  | 100.00 | 100.00 |

A correction fluid containing the above ingredients was prepared by:

1. Adding the specified amount of deionized water into a clean mixing tank equipped with a Cowles type (saw tooth) mixing blade.

2. Turning on the mixer and running it at 400–600 rpm.

3. Adding the specified amount of dispersant, e.g., Nopcosperse® 44, and running the mixer for five minutes.

4. Increasing the speed to 700 rpm, but reducing the speed if excessive foam develops.

5. Turning on the dust collector and slowly adding the specified amount of titanium dioxide pigment, e.g., Ti-Pure® R900 powder, at a rate which allows complete dispersion of the powder. More Ti-Pure® R900 is not added until all clumps are broken apart. Speed is adjusted as necessary to be fast enough to maintain a vortex and good dispersion, yet not so fast as to develop foam.

6. Slowly adding the specified amount of kaolin clay, e.g., Kaopaque 10-S, again allowing it be fully dispersed before more is added. Turning off the dust collector and mixing for twenty minutes at 700 rpm.

7. Adding the specified amount of colorant, e.g., Mars Black and Burnt Umber.

8. Mixing for twenty minutes.

9. Checking the Hegman grind.

10. Reducing the speed to 600 rpm, adding the film-forming acrylic emulsion binder, e.g., UCAR® Latex 446, and mixing until fully incorporated (about ten minutes).

11. Adding the specified amount of wetting agent, e.g., Surfynol® 104 PA, and mixing for five minutes.

12. Slowly adding the specified amount of ink fixing agent, e.g., Rhoplex® PR-26, directly into the vortex. A slow rate of addition is necessary to avoid destabilization of the formulation.

13. Adding the specified amount of the antibacterial agent, e.g., Kathon®, and mixing for five minutes.

14. Adding the specified amount of defoamer, e.g., Nopco® 8034, reducing the speed to 300 rpm, and mixing for 30 minutes.

15. Checking the viscosity.

To insure that the cationic ink fixing agent will not destabilize the correction fluid, it should be added to the mixture after all of the other major ionically charged ingredients have been mixed into a stable dispersion.

The preferred correction fluids can be used in conventional bottle and brush applicators, as well as other known correction fluid applicators.

Other embodiments are within the claims. For example, in addition to the preferred ingredients listed above, the correction fluids can also contain various additives known in the art, as long as they do not interfere with the cationic ink fixing agent, i.e., as long as they are substantially cationic or nonionic. These additives are used to improve specific properties of the fluid, and include plasticizers to improve dry film adhesion and flexibility, flattening agents to control film gloss, flow additives and thickeners to control brushing, leveling, and settling, and pigment extenders in addition to kaolin, to decrease cost.

Many other variations and modifications may be made in the correction fluid by those having experience in this technology, without departing from the concept of the present invention. Accordingly, it should be clearly understood that the correction fluid and method of mixing the correction fluid formulation referred to in the foregoing description are illustrative only and are not intended as limitations on the scope of the invention.

What is claimed is:

1. A bleed resistant aqueous correction fluid for use with ball pen inks, comprising water, an opacifying pigment dispersed in said water, a non-film-forming cationic polymer that inhibits bleeding, and a water-insoluble film-forming polymer that has a chemical structure that is different from the chemical structure of said non-film-forming cationic polymer, wherein said correction fluid has a total solids content of at least 60%, a drying time of less than 90 seconds at 25° C., and a viscosity of less than 1500 cps at 25° C.

2. The correction fluid of claim 1, wherein said film-forming polymer is an acrylic copolymer.

3. The correction fluid of claim 1, wherein said drying time is less than 60 seconds at 25° C.

4. The correction fluid of claim 1, wherein said drying time is less than 50 seconds at 25° C.

5. The correction fluid of claim 1, wherein said cationic polymer comprises a non-film-forming acrylic copolymer.

6. The correction fluid of claim 1, wherein said opacifying pigment is a rutile titanium dioxide composition comprising titanium dioxide particles having an average diameter of less than 0.8 micrometer and having a hydrophilic surface.

7. The correction fluid of claim 6, wherein said titanium dioxide particles comprise at least 94% by weight of said titanium dioxide composition, and wherein said hydrophilic surface results from treatment of said particles with alumina or a combination of alumina and silica.

8. The correction fluid of claim 1, further comprising an anionic dispersant.

9. The correction fluid of claim 8, wherein said anionic dispersant is a sodium salt of a carboxylate polyelectrolyte.

10. The correction fluid of claim 1, further comprising a nonionic wetting agent.

11. The correction fluid of claim 1, comprising between 45 and 60% of said opacifying pigment by weight, between 0.5 and 5.0% of said cationic polymer by weight, between 10 and 25% of said film-forming polymer by weight, and between 15 and 30% of water by weight.

12. The correction fluid of claim 11, comprising between 47 and 53% of said opacifying pigment by weight, between 0.8 and 1.2% of said cationic polymer by weight, between 15 and 22% of said film-forming polymer by weight, and between 18 and 22% of water by weight.

13. The correction fluid of claim 1, wherein said correction fluid has a viscosity of between 100 cps and 1,000 cps at 25° C.

14. The correction fluid of claim 1, wherein said correction fluid has a viscosity of between 300 cps and 600 cps at 25° C.

15. The correction fluid of claim 1, wherein said correction fluid has a total solids content of at least 65%.

16. The correction fluid of claim 1, wherein said correction fluid has a total solids content of at least 67%.

17. The correction fluid of claim 1, wherein said correction fluid has a total solids content of at least 68%.

18. The correction fluid of claim 1, wherein said correction fluid has a pH of between 7.5 and 11.

19. The correction fluid of claim 1, wherein said correction fluid contains no organic solvents.

20. A method of making a stable water-based correction fluid comprising mixing water with an opacifying pigment and a dispersing agent to form a dispersion, adding a film-forming polymer to said dispersion and mixing to distribute said film-forming polymer in said dispersion, and adding a cationic non-film-forming polymer that inhibits bleeding to said dispersion, wherein said correction fluid has a solids content of at least 60%, and a viscosity of less than 1500 cps at 25° C., and a drying time of less than 90 seconds at 25° C.

21. A method of covering a water-fast ink marking on paper, comprising;

applying over a water-fast marking on a paper substrate a correction fluid comprising water, an opacifying pigment dispersed in said water, a non-film-forming cationic polymer that inhibits bleeding, and a water insoluble film-forming polymer that has a chemical structure that is different from the chemical structure of said non-film-forming cationic polymer dispersed in said water, wherein said correction fluid has a solids content of at least 60%, a viscosity of less than 1500 cps at 25° C., and a drying time of less than 90 seconds at 25° C.

22. The method of claim 21,, wherein said correction fluid is applied over said marking with a brush.

23. A bleed resistant aqueous correction fluid for use with ball point inks, comprising water, an opacifying pigment dispersed in said water, a non-film forming cationic polymer that inhibits bleeding, and a water-insoluble film-forming polymer, wherein said correction fluid has a total solids content of at least 65%, a drying time of less than 90 seconds at 25° C., and a viscosity of less than 1500 cps at 25° C.

24. A bleed resistant aqueous correction fluid for use with ball pen inks, comprising water, an opacifying pigment dispersed in said water, a cationic polymer that inhibits bleeding, and a water-insoluble film-forming polymer that has a chemical structure that is different from the chemical structure of said cationic polymer, wherein the quantity of said water, said opacifying pigment, wherein said correction fluid has a total solids content of at least 60%, a drying time of less than 90 seconds at 25° C., and a viscosity of less than 1500 cps.

25. An aqueous correction fluid, comprising:

water;

an opacifying pigment dispersed in the water;

a non-film-forming cationic polymer; and a water-insoluble film-forming polymer that is separate and distinct from the non-film-forming cationic polymer, wherein the aqueous correction fluid has a total solids content of at least 60%, a drying time of less than 90 seconds at 25° C., and a viscosity of less than 1500 cps at 25° C.

* * * * *